US012144042B2

(12) United States Patent
Mann et al.

(10) Patent No.: US 12,144,042 B2
(45) Date of Patent: Nov. 12, 2024

(54) DEVICES AND METHODS FOR SINGLE-CHANNEL AND MULTI-CHANNEL WLAN COMMUNICATIONS

(71) Applicant: Intel Corporation, Santa Clara, CA (US)

(72) Inventors: Eytan Mann, Modiin (IL); Eran Friedlander, Rehovot (IL); Idan Zalitzky, Raanana (IL); Guy Halperin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 17/128,243

(22) Filed: Dec. 21, 2020

(65) Prior Publication Data

US 2022/0201782 A1 Jun. 23, 2022

(51) Int. Cl.
| | |
|---|---|
| *H04W 76/15* | (2018.01) |
| *H04W 84/12* | (2009.01) |
| *H04W 88/10* | (2009.01) |
| *H04W 92/10* | (2009.01) |
| *H04W 92/20* | (2009.01) |

(52) U.S. Cl.
CPC ........... *H04W 76/15* (2018.02); *H04W 88/10* (2013.01); *H04W 84/12* (2013.01); *H04W 92/10* (2013.01); *H04W 92/20* (2013.01)

(58) Field of Classification Search
CPC ..... H04W 76/15; H04W 88/10; H04W 88/12; H04W 92/10; H04W 92/20

USPC .......................................................... 370/329
See application file for complete search history.

(56) References Cited

U.S. PATENT DOCUMENTS

2009/0274202 A1* 11/2009 Hanke ................... H04W 88/06
375/220

FOREIGN PATENT DOCUMENTS

WO    WO-2015047322 A1 *   4/2015   ............ H04W 36/14

* cited by examiner

*Primary Examiner* — Intekhaab A Siddiquee
(74) *Attorney, Agent, or Firm* — VIERING, JENTSCHURA & PARTNER MBB

(57) ABSTRACT

Devices and methods presented in this disclosure provide a single-channel WLAN device with a small add-on in the form of a second digital interface component and switch circuitry to allow for two such WLAN devices to be cascaded to support dual-channel WLAN operations. The WLAN device may include a first digital interface component including a first digital interface terminal configured for communicating with a first device external to the WLAN device; a second digital interface component including a second digital interface terminal configured for communicating with a second device external to the WLAN device; a switch circuitry coupling the first digital interface component to the second digital interface component and to a WLAN modem; and the WLAN modem configured to operate in one or more frequency bands and including one or more terminals configured to be coupled with a RF front end (FE) circuitry.

19 Claims, 10 Drawing Sheets

902 — In addition to a first digital interface component for configured for communicating with a first device external to the WLAN device, providing a second digital interface component configured for communicating with a second device external to the WLAN device 904 — Providing a switch circuitry coupling the first digital interface component to the second digital interface component and to a WLAN modem of the WLAN device

1002 — In a first single-channel WLAN device, providing a first digital interface component configured for communicating with a first device external to the first single-channel WLAN device, a second digital interface component configured for communicating with a second WLAN device, and a switch circuitry 1004 — Providing a second digital interface between a second digital interface component of the first single-channel WLAN device and a first digital interface component of a second single-channel WLAN device

DEVICES AND METHODS FOR SINGLE-CHANNEL AND MULTI-CHANNEL WLAN COMMUNICATIONS

TECHNICAL FIELD

Various aspects relate generally to wireless communications and wireless local area network (WLAN) devices.

BACKGROUND

Wireless local area networks (WLANs) are widely used in modern communications and continue to evolve at a rapid pace. New standards are rectified every several years, bandwidth (BW) and spectral utilization are increased, and more. Recently, the use of dual-channel WLAN has become more prevalent. Generally, dual-channel WLAN can support concurrent communications on two or more frequency bands selected from a low-band (LB) at 2.4 GHz, a high-band (HB) in the range of 5-6 GHz, an ultra-high-band (UHB) in the range of 6-7 GHZ, or WiGig in the 60 GHZ frequency band.

However, there is still a large market for single-channel WLAN solutions, and as of the present, the market for single-channel WLAN devices is still larger than that of dual-channel WLAN devices. Conventional single-channel WLAN devices may be configured to operate in any one of the frequency bands listed above, but only in one of the frequency bands at a time.

It is easily understood that dual-channel WLAN device, e.g., a dual-channel network interface controller (NIC) chip, compared to a single-channel WLAN device, e.g., a single-channel NIC chip, is more costly since may require, among other things, double the Medium Access Control (MAC) processing (or at least a MAC controller that can digest double the BW in the dual-channel context), twice the silicon area for the modem(s) to support the dual-channel scheme, a more complex power management mechanism, and more. Up to now, for vendors to deliver single-channel and dual-channel devices, two NIC chips are needed to be developed, i.e., one NIC chip for the single-channel device and another, more robust NIC chip for the dual-channel device. In other words, two separate methods of production are needed. Simply taking the dual-channel device and marketing it as a single-channel device would be impractical as approximately half the dual-channel device would be rendered nonfunctional.

Accordingly, it would be advantageous to develop a single WLAN device that could be effectively configured to support both single-channel WLAN and multi-channel (e.g., dual-channel) WLAN communications.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 9 exemplarily shows a flowchart illustrating a method for producing a single-channel WLAN device according to some aspects; and FIG. 10 exemplarily shows a flowchart illustrating a method for producing a dual-channel WLAN device according to some aspects.

DESCRIPTION

Figure 1:
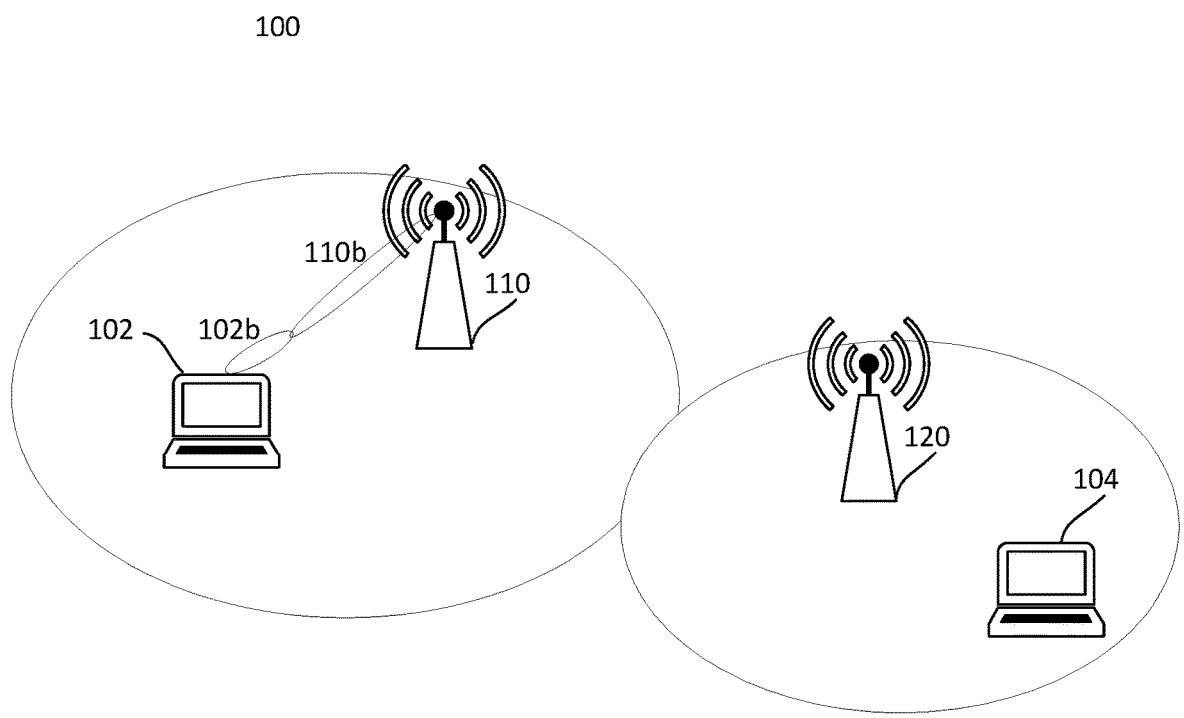
FIG. 1 exemplarily shows a radio communication network according to some aspects.

The devices and methods presented in this disclosure provide a single-channel WLAN device (e.g., a single-channel WLAN network interface controller (NIC) chip) with a relatively small add-on to allow for two such WLAN devices to be cascaded to upgrade to support dual-channel WLAN operation. In this manner, according to some aspects, a single production line may produce one WLAN device that can be used in both a single-channel WLAN system or in a dual-channel WLAN system.

Furthermore, in the dual-channel aspect, the methods and devices disclosed herein provide advantages over conventional dual-channel devices in areas such as thermal management and radio frequency (RF) as the dual-channel operation is supported via two separate WLAN devices with a single interface to a host processor. In some aspects, methods and devices provide a single-channel WLAN device configured for single-channel WLAN operation in multiple input, multiple output (MIMO) communications which may be configured to cascade with second WLAN device to support dual-channel WLAN operation with MIMO via a single-interface with a host processor on a system on chip (SoC).

In some aspects, the WLAN devices described herein include a switch in front of the prime connection to the host processor. Such a switch, along with the addition of a second digital interface component, allows a second WLAN device to be cascaded with a first WLAN device to support dual-band functionality without the need for the host processor to have a direct interface with the second, cascaded WLAN device.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wireless Local Area Network (WLAN) Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes).

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/formula/relationship and 'indirect' calculations via lookup or hash tables and other array indexing or searching operations.

Figure 2:
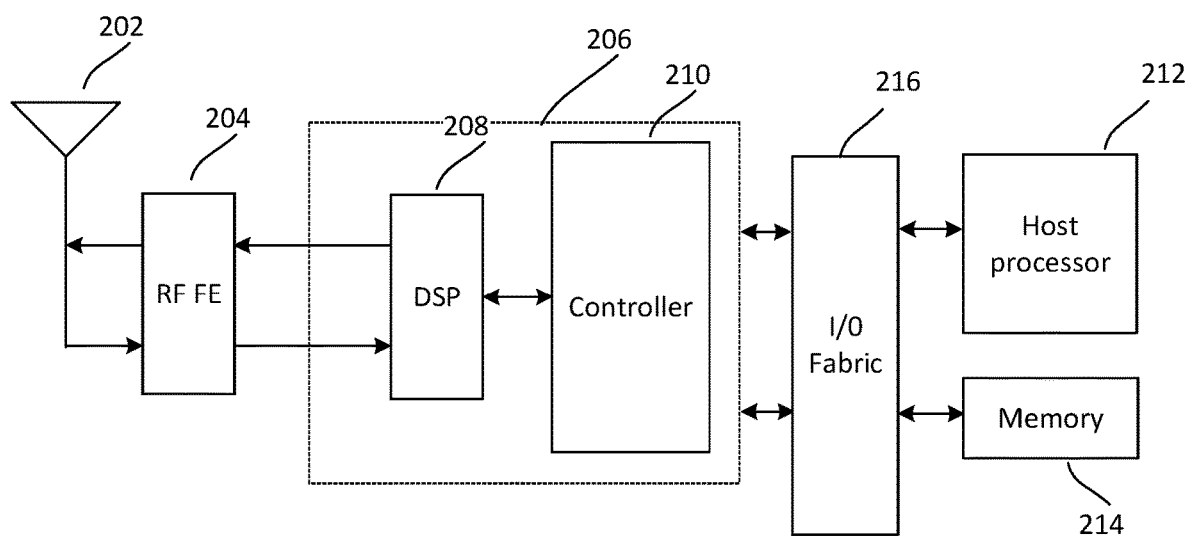
FIG. 2 exemplarily shows an internal configuration of terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., WLAN/WiFi, 5G, NR, LTE, or other 3rd Generation Partnership Project (3GPP) networks, Bluetooth, mmWave, etc.), these examples are demonstrative and may therefore be readily applied to any other type or configuration of radio access network. As shown in radio communication network 100, terminal devices 102 and 104 may be personal computers (PCs, e.g., laptops) and network access nodes 110 and 120 may be WLAN APs, but it is appreciated that this is demonstrative in nature and other terminal devices and network access nodes may be implemented. The number of network access nodes and terminal devices in radio communication network 100 is exemplary and is scalable to any amount.

In an exemplary short-range context, network access node 110 and 120 may be access points (APs, e.g., WLAN APs), while terminal device 102 and 104 may be terminal devices (e.g., UEs, WLAN stations (STAs), etc.). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a WLAN context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include WLAN, LTE, UMTS, GSM, WiMAX, WiGig, Bluetooth, etc., any of which may be applicable to radio communication network 100.

As shown in radio communication network 100, terminal device 102 and network access node 110 may each use beamforming techniques 102b and 110b, respectively, for communicating with one another. Each may both have at least one RF chain and multi-antenna arrays. Accordingly, the devices shown in network 100 may be capable of bidirectional beamforming.

FIG. 2 shows an internal configuration of terminal device 102 according to some aspects, which may include antenna system 202, radio frequency (RF) front end (FE) 204 (i.e., RF transceiver), a network interface controller (NIC) 206 (including digital signal processor 208 and protocol controller 210), a host processor (i.e., application processor) 212, memory 214, and an input/output (I/O) system fabric 216. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. NIC 206 may include modem components which direct such communication functionality of terminal device 102 according to the communication protocols associated with each radio access network, and may execute control over antenna system 202 and RF FE 204 to transmit and receive radio signals according to the formatting and scheduling parameters defined by each communication protocol. Although various practical designs may include separate communication components for each supported radio communication technology (e.g., a separate antenna, RF FE, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas capable of supporting MIMO communications. In some aspects, antenna system 202 may additionally include analog antenna combination and/or beamforming circuitry. In the receive (RX) path, RF FE 204 may receive analog radio frequency signals from antenna system 202 and perform analog and digital RF front-end processing on the analog radio frequency signals to produce digital baseband samples (e.g., In-Phase/Quadrature (IQ) samples) to provide to NIC 206. RF FE 204 may include analog and digital reception components including amplifiers (e.g., Low Noise Amplifiers (LNAs)), filters, RF demodulators (e.g., RF IQ demodulators)), and analog-to-digital converters (ADCs), which RF FE 204 may utilize to convert the received radio frequency signals to digital baseband samples. In the transmit (TX) path, RF FE 204 may receive digital baseband samples from the NIC 206 and perform analog and digital RF front-end processing on the digital baseband samples to produce analog radio frequency signals to provide to antenna system 202 for wireless transmission. RF FE 204 may thus include analog and digital transmission components including amplifiers (e.g., Power Amplifiers (PAs)), filters, RF modulators (e.g., RF IQ modulators), and digital-to-analog converters (DACs), which RF FE 204 may utilize to mix the digital baseband samples received from NIC 206 and produce the analog radio frequency signals for wireless transmission by antenna system 202. In some aspects, NIC 206 may control the radio transmission and reception of RF transceiver 204, including specifying the transmit and receive radio frequencies for operation of RF transceiver 204.

As shown in FIG. 2, NIC 206 may include digital signal processor 208, which may perform physical layer (PHY, Layer 1) transmission and reception processing to, in the transmit path, prepare outgoing transmit data provided by protocol controller 210 for transmission via RF FE 204, and, in the receive path, prepare incoming received data provided by RF FE 204 for processing by protocol controller 210. Digital signal processor (DSP) 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF FE 204, and digital signal processor 208) in accordance with the communication protocols of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF FE 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF FE 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF FE 204, digital signal processor 208, and protocol controller 210 are shown as individual components in FIG. 2, in some aspects, antenna system 202, RF FE 204, digital signal processor 208, and/or protocol controller 210 can encompass separate components dedicated to different radio communication technologies.

I/O fabric 216 includes components that allow the NIC 206 to send and receive communications with various other components of terminal device 102. For example, messages are switched at I/O fabric 216 to various other components such as the host processor 212 and/or the memory 214.

The terminal device 102 may also include a host processor 212 and memory 214 which may interface with the NIC 206 via I/O fabric 216. Host processor 212 may be one or more CPU(s) located on a system on chip (SoC), and may be configured to handle the layers above the protocol stack, including the transport and application layers. Host processor 212 may be configured to execute various applications and/or programs of terminal device 102 at an application layer of terminal device 102, such as an operating system (OS), a user interface (UI) for supporting user interaction with terminal device 102, and/or various user applications. The host processor 212 may interface with NIC 206 via I/O fabric 216 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by host processor 212 according to the layer-specific functions of the protocol stack, and provide the resulting data to digital signal processor 208. Digital signal processor 208 may then perform physical layer processing on the received data to produce digital baseband samples, which digital signal processor may provide to RF FE 204. RF FE 204 may then process the digital baseband samples to convert the digital baseband samples to analog RF signals, which RF FE 204 may wirelessly transmit via antenna system 202. In the receive path, RF FE 204 may receive analog RF signals from antenna system 202 and process the analog RF signals to obtain digital baseband samples. RF FE 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to host processor 212. Host processor 212 may then handle the incoming data at the application layer, which can include execution of one or more application programs with the data and/or presentation of the data to a user via a user interface.

In some aspects, some wireless signal processing functions and components described for NIC 206 may be moved to host processor 212. For example, in the Intel® Integrated Connectivity (CNVi) Architecture, processors and the associated logic and memory for Medium Access Control (MAC) layer processing may be done by the host processor 212. In such cases, the interface between NIC 206 and host processor 212 may be configured to handle MAC layer communications. In some aspects, this interface may be an Intel® CNVio interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120.

Figure 3:
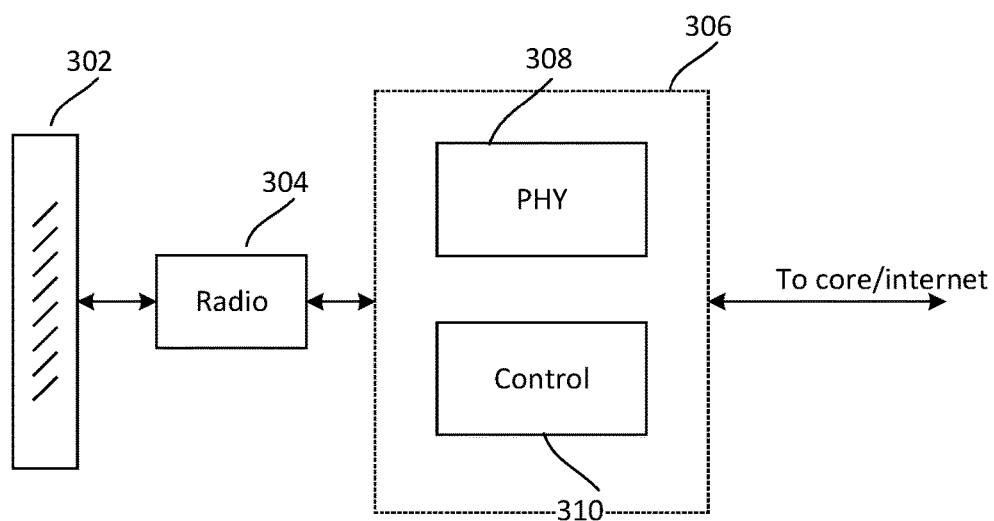
FIG. 3 exemplarily shows an internal configuration of a network access node in some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and protocol controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, where the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

For example, network access node 110 may be a WLAN AP configured to provide single-band WLAN communications or a WLAN AP configured to provide dual-band, triple-band, or quadruple-band WLAN communications.

In some aspects, a single-channel WLAN device includes a relatively small silicon add-on that allows for it to be cascaded with one or more other similar single-channel device(s) to allow for dual-channel (or more) WLAN communications. This add-on includes a second digital interface component and a switch circuitry.

Each single-channel WLAN device may be configured to support any WLAN channel, i.e., LB, HB, UHB, etc. In some aspects, the add-on needed to implement the devices of this disclosure is in the range of 5% extra silicon above a conventional single-channel device that is not capable of being cascaded in the manners described herein. In the dual-channel aspects, the devices herein may be capable of supporting a plurality of channels (e.g., dual-channel) at full performance with no communication quality degradation.

In some aspects, advantages of the methods and devices of this disclosure include an optimized WLAN device chip that may be used in a single-channel WLAN terminal device, or, if two of such WLAN devices are cascaded together, being able to be used in a dual-channel WLAN terminal device.

Figure 4:
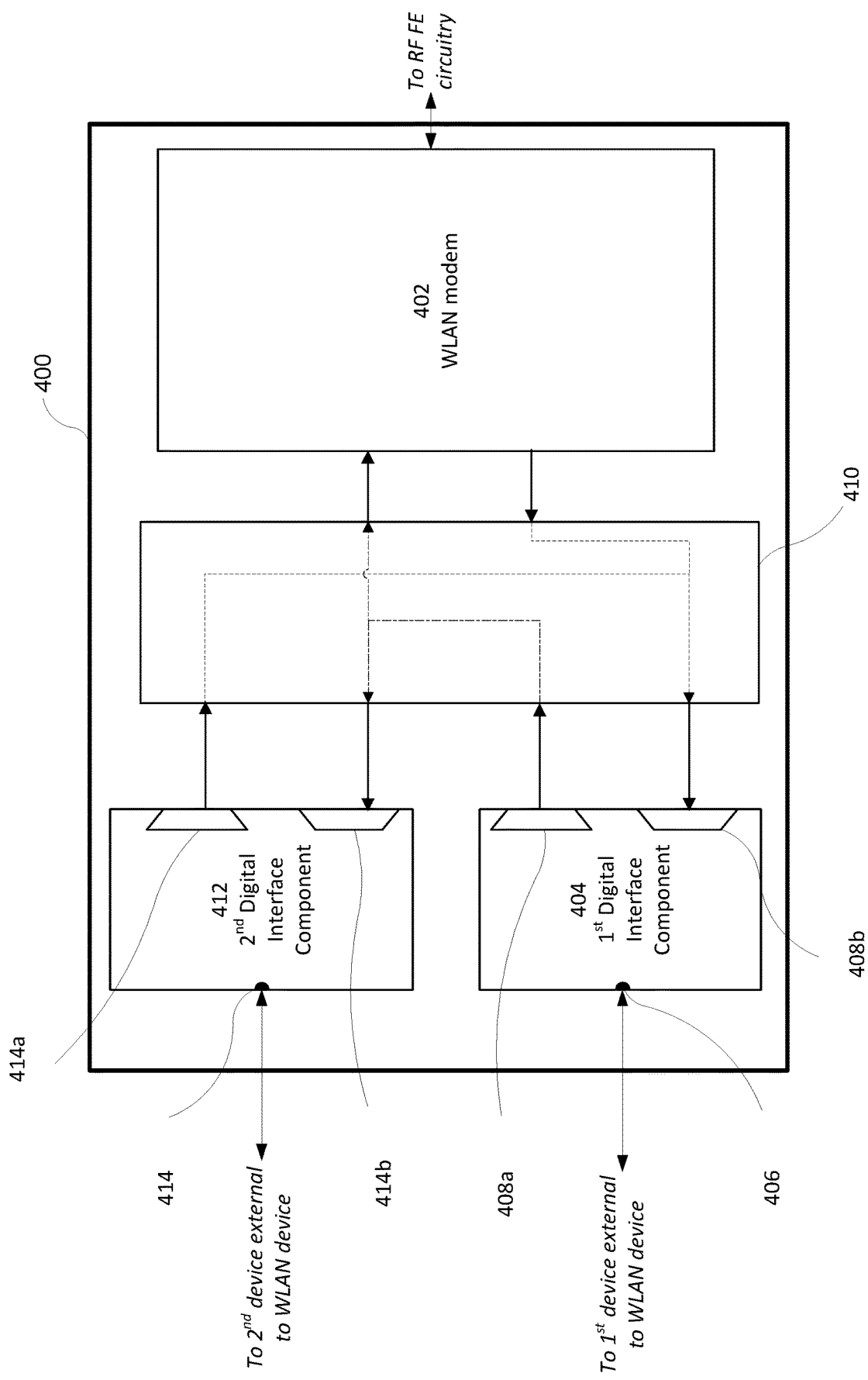
FIG. 4 exemplarily shows an example of a WLAN device according to some aspects.

FIG. 4 shows a WLAN device 400 according to some aspects. It is appreciated that WLAN device 400 is exemplary in nature and may thus be simplified for purposes of this explanation. Accordingly, certain components of WLAN device 400 may be omitted for purposes of conciseness. For example, while not shown in WLAN device 400, other components for supporting Bluetooth in a shared WLAN/Bluetooth connectivity scheme may be included. Another example is that a power management integrated circuit (PMIC) into each WLAN device as a single PMIC or a dual PMIC. Furthermore, it is appreciated that WLAN device 400, like other figures in this application, is not drawn to scale and certain components may be made to look larger for purposes of this explanation.

WLAN device 400 may include components corresponding to NIC 206 in FIG. 2. For example, WLAN device 400 may include signal processing components and appropriate interface components located between the RF FE (e.g., RF FE 204) and a host processor on a SoC (e.g., host processor 212). WLAN device 400, used along with a host processor, a RF FE, and an antenna system, may therefore include the hardware and/or the software to provide a terminal device with the capability to conduct WLAN communications on a single-channel at a given time instant. In some aspects, WLAN modem 402 may include a digital signal processor, controller, and/or other analog and RF components to perform WLAN communication signal processing generally described in the wireless signal processing mechanisms for NIC 206 discussed in FIG. 2. WLAN modem 402 may also include a terminal to provide an interface with the RF FE circuitry, which may be configured to support one or more of LB, HB, UHB, or WiGig/mmWave communications via a 1×2, 2×2, or 4×4 antenna array, for example.

In addition to including the WLAN modem 402, WLAN device 400 may also include a first digital interface component 404. The first digital interface component 404 may be a digital interface port that includes input/output (I/O) hardware for supporting a digital interface protocol. This may include PCI Express (PCIe) interface, an Intel® Serially Time-Encoded Protocol (STEP) interface, an Intel® Integrated Connectivity interface, or the like. For example, the Intel® Integrated Connectivity interface may be used in instances where the Medium Access Control (MAC) layer processing is performed at a host processor in the SoC (i.e., external to WLAN device 400). Accordingly, first digital interface component 404 may be configured to support MAC layer communications via first digital interface terminal 406.

First digital interface component 404 may be configured with first digital interface terminal 406 to support a first interface with a first device external to the WLAN device 400. For example, this first device may be a system on chip (SoC) including a host processor. First digital interface component 404 may also include two first digital interface intra-device communication terminals 408a and 408b. First digital interface intra-device communication terminal 408a may include one or more output terminals configured to output signals from first digital interface component 404 to other components of WLAN device 400 and the second digital interface intra-device communication terminal 408b may include one or more input terminals configured to input signals from other components of WLAN device 400 to the first digital interface component 404.

According to aspects of this disclosure, in addition to including WLAN modem 402 and first digital interface component 404 to support single-channel WLAN communications, WLAN device 400 includes switch circuitry 410 and a second digital interface component 412. Switch circuitry 410 and second digital interface component 412 may be the add-on mentioned elsewhere in this disclosure, and, for example, provide an approximately 5% silicon add-on to a conventional WLAN single-channel device. In other words, conventional WLAN single-channel devices do not include switch circuitry 410 and second digital interface component 412.

Second digital interface component 412 may be substantially similar to first digital interface component 404 and may be configured with a second digital interface terminal 414 configured to support a second interface with a second device external to the WLAN device 400. This second digital interface component 412 may be a second digital interface port similar to the first digital interface component 404. For example, this second device may be another WLAN device that WLAN device 400 is cascaded with to support dual-channel WLAN communications. Second digital interface component 412 may also include two second digital interface intra-device communication terminals 414a and 414b. First digital interface intra-device communication terminal 414a may include one or more output terminals configured to output signals from second digital interface component 412 to other components of WLAN device 400 and the second digital interface intra-device communication terminal 414b may include one or more input terminals configured to input signals from other components of WLAN device 400 to the second digital interface component 412.

Switch circuitry 410 may include switching components for directing signals in WLAN device and may include switches, logic circuits, and/or semiconductor logic gates for performing the methods described herein. This may include multiplexing and de-multiplexing components. As shown in WLAN device 400, switch circuitry 410 may be configured to receive signals from first digital interface component 404, and direct signals to either WLAN modem 402 or to second digital interface component 412. Switch circuitry 410 may direct signals to WLAN modem 402 if they include data to be transmitted on the WLAN channel that WLAN device 400 is configured to conduct communications on and may direct signals to second digital interface component 412 if they include data to be transmitted data on a second WLAN channel (in a dual-channel setting) that WLAN device 400 is not currently configured to conduct communications on. For example, if WLAN device 400 is configured to conduct communications on the LB, then switch circuitry 410 forwards LB signals to WLAN modem 402 and forwards other signals (e.g., HB signals, UHB signals) to second digital interface component 412. Accordingly, switch circuitry 410 may include components to identify input signals by a frequency/associated communication channel (e.g., LB, HB, UHB), a PHY or MAC header, or the like, and route them to the appropriate destination (e.g., the WLAN modem 402 or the second digital interface component 412).

Switch circuitry 410 is also configured to receive signals from WLAN modem 402 and direct these signals to first digital interface component 404 for forwarding on to the first device, e.g., a host processor on a SoC, via first digital interface terminal 406. Switch circuitry 410 is also configured to receive signals from second digital interface component 412 and direct these signals to first digital interface component 404 for forwarding on to the first device via first digital interface terminal 406. In this manner, switch circuitry 410 is configured to receive signals from second digital interface component 412 and forward them to the first digital interface component 404, bypassing the WLAN modem 402.

Figure 5:
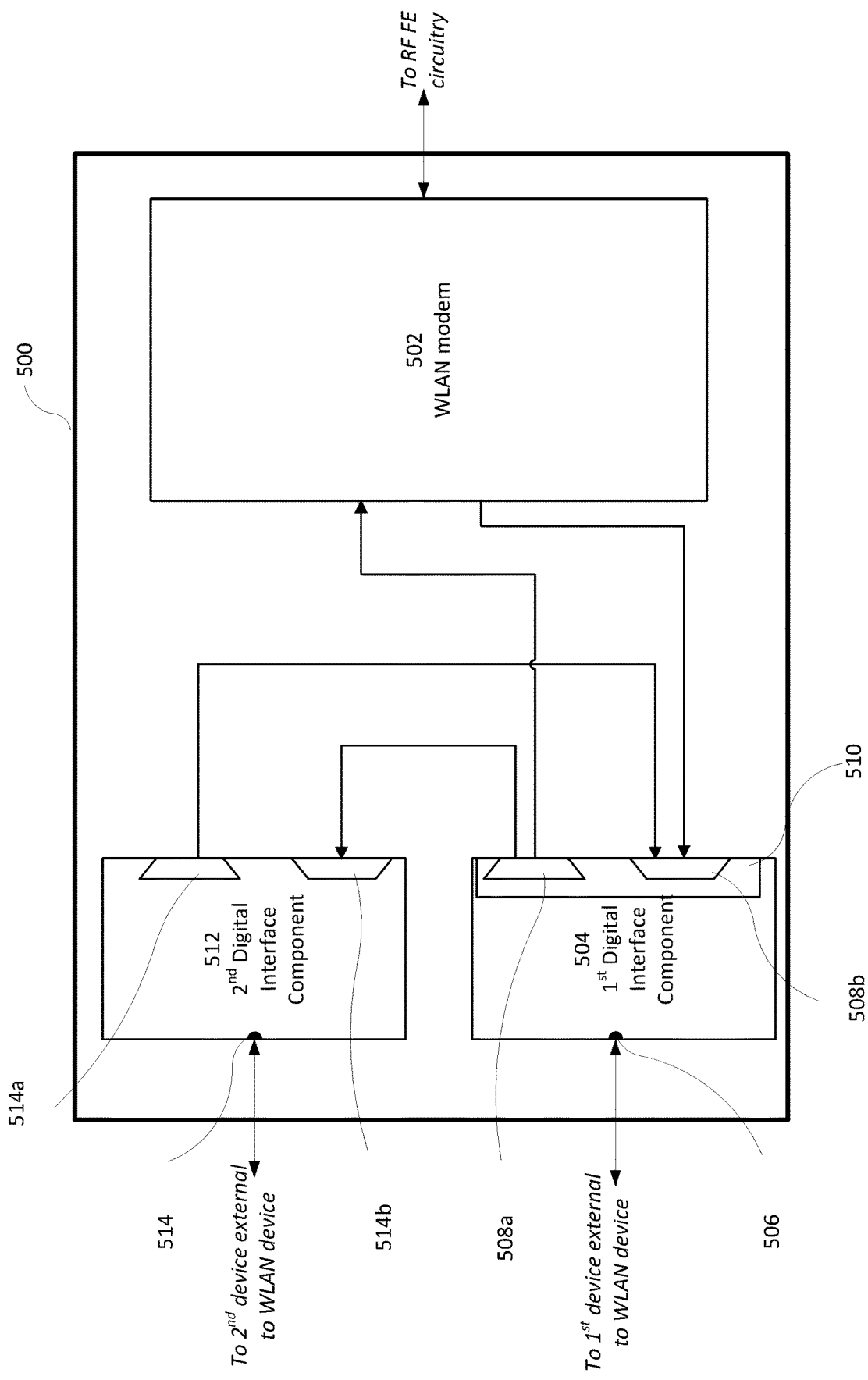
FIG. 5 exemplarily shows another example of a WLAN device according to some aspects FIG. 6 exemplarily shows an example of a dual-channel WLAN system according to some aspects.

FIG. 5 shows a WLAN device 500 according to some aspects. Similar to WLAN device 400, it is appreciated that WLAN device 500 is exemplary in nature and may thus be simplified for purposes of this explanation. Accordingly, certain components of WLAN device 500 may be omitted for purposes of conciseness.

The components of WLAN device 500 may correspond to those described in WLAN device 400, and may include WLAN modem 502, first digital interface component 502, switch circuitry 510, and second digital interface component 512.

WLAN modem 502 may correspond to WLAN modem 402 and include similar hardware and/or software for conducting WLAN communications on a single-channel at a time.

First digital interface component 504 includes a first digital interface terminal 506 configured to support a first interface with a first device external to the WLAN device 500. For example, this first device may be a system on chip (SoC) including a host processor. First digital interface component 504 may also include two first digital interface intra-device communication terminals 508a and 508b. First digital interface intra-device communication terminal 508a may include one or more output terminals configured to output signals from first digital interface component 504 to other components of WLAN device 500 and the second digital interface intra-device communication terminal 508b may include one or more input terminals configured to input signals from other components of WLAN device 500 to the first digital interface component 504.

Second digital interface component 512 may be configured with a second digital interface terminal 514 configured to support a second interface with a second device external to the WLAN device 500. For example, this second device may be another WLAN device 500 to support dual-channel WLAN communications. Second digital interface component 512 may also include two second digital interface intra-device communication terminals 514a and 514b. First digital interface intra-device communication terminal 514a may include one or more output terminals configured to output signals from second digital interface component 512 to other components of WLAN device 500 and the second digital interface intra-device communication terminal 514b may include one or more input terminals configured to input signals from other components of WLAN device 500 to the second digital interface component 512.

As shown in WLAN device 500, a difference of WLAN device 500 with respect to WLAN device 400 is that the switch circuitry 510 is integrated into first digital interface component 504. However, besides being integrated into first digital interface component 504, switch circuitry 510 may perform substantially the same functions and include similar components as described with respect to switch circuitry 410. Switch circuitry 510 may forward signals intended to be communicated on a channel that WLAN device 500 is configured to conduct communications on to WLAN modem 502 and forward signals to be communicated on other channels to second digital interface component 512. For example, if WLAN device 500 is configured to conduct communications on the LB, then switch circuitry 510 forwards LB signals to WLAN modem 502 and forwards other signals (e.g., HB signals, UHB signals) to second digital interface component 512. Accordingly, switch circuitry 510 may include components to identify input signals by a frequency or associated communication channel (e.g., LB, HB, UHB), a PHY or MAC header, or the like, and route them to the appropriate destination (i.e., the WLAN modem 502 or the second digital interface component 512).

Switch circuitry 510 is also configured to receive signals from WLAN modem 502 and direct these signals through the first digital interface component 504 for forwarding on to the first device, e.g., a host processor on a SoC, via first digital interface terminal 506. Additionally, switch circuitry 510 is configured to receive signals from second digital interface component 512 and direct these signals to through first digital interface component 504 for forwarding on to the first device via first digital interface terminal 506.

Referring now to FIGS. 4 and 5, the WLAN devices 400, 500 presented herein provide a single-channel WLAN device with an added digital interface component (e.g., second digital interface component 412 or 512) and a switch component (e.g., switching circuitry 410 or 510). While the add-ons may not functionally impact a single single-channel WLAN device operating in single-channel WLAN communications, they provide the added functionality to enable the single-channel WLAN device to be cascaded with a second single-channel WLAN device to operate in dual-channel WLAN communications while maintaining a single interface (via the first WLAN device) with a host processor. In other words, a separate interface directly between the host processor and the second WLAN device is not needed to support dual-channel WLAN communications as the first WLAN device serves as the intermediary between the second WLAN device and the host processor.

In some aspects, if the interface connection between WLAN device 400/500 and the host processor on the SoC is through a PCIe interface via 406/506, first digital interface component 404/504 and second digital interface 412/512 may be PCIe interface ports. In this example, WLAN modem 402/502 may be configured to perform MAC layer processing on the data link layer, including encapsulating higher-level frames into appropriate frames for the transmission medium and adding frame check sequences for forwarding the data to the PHY layer as soon as the appropriate channel access method permits it. In WLAN, for example, the channel access method may include carrier-sense multiple access with collision avoidance (CSMA/CA). The addition of the extra PCIe port as the second digital interface component to WLAN device 400/500 and the switch circuitry 410/510 may include the addition of 500k gates and may correspond to an added silicon area of less than 0.8 mm² in a 16 FFC (FinFet Compact) model. No further additions may be needed on the host processor side as the host processor may already be configured to support multifunction PCIe IP via the on-chip system fabric. Furthermore, since a single connection to the host is maintained for both single-channel WLAN communications (only using one WLAN device 400/500) and in dual-channel WLAN communications (using two WLAN devices 400/500 cascaded as show in the following figures), there is a reduced interface burden on the host side when using the dual-channel (or more, if one or more WLAN devices 400/500 are cascaded to the second WLAN device) aspects disclosed herein. In the PCIe example, this may include a dual PCIe function at the host side where the MAC and PHY layer processing for each WLAN band (one in single-channel, two in dual-channel) is performed by the WLAN modem 402/502 of the respective WLAN device 400/500. In another example, as discussed in FIG. 8, there may be no need for multifunction PCIe at the host side (single function PCIe is sufficient) with the implementation of a Dual-Band MAC layer processor between the SoC and the first WLAN device.

Figure 8:
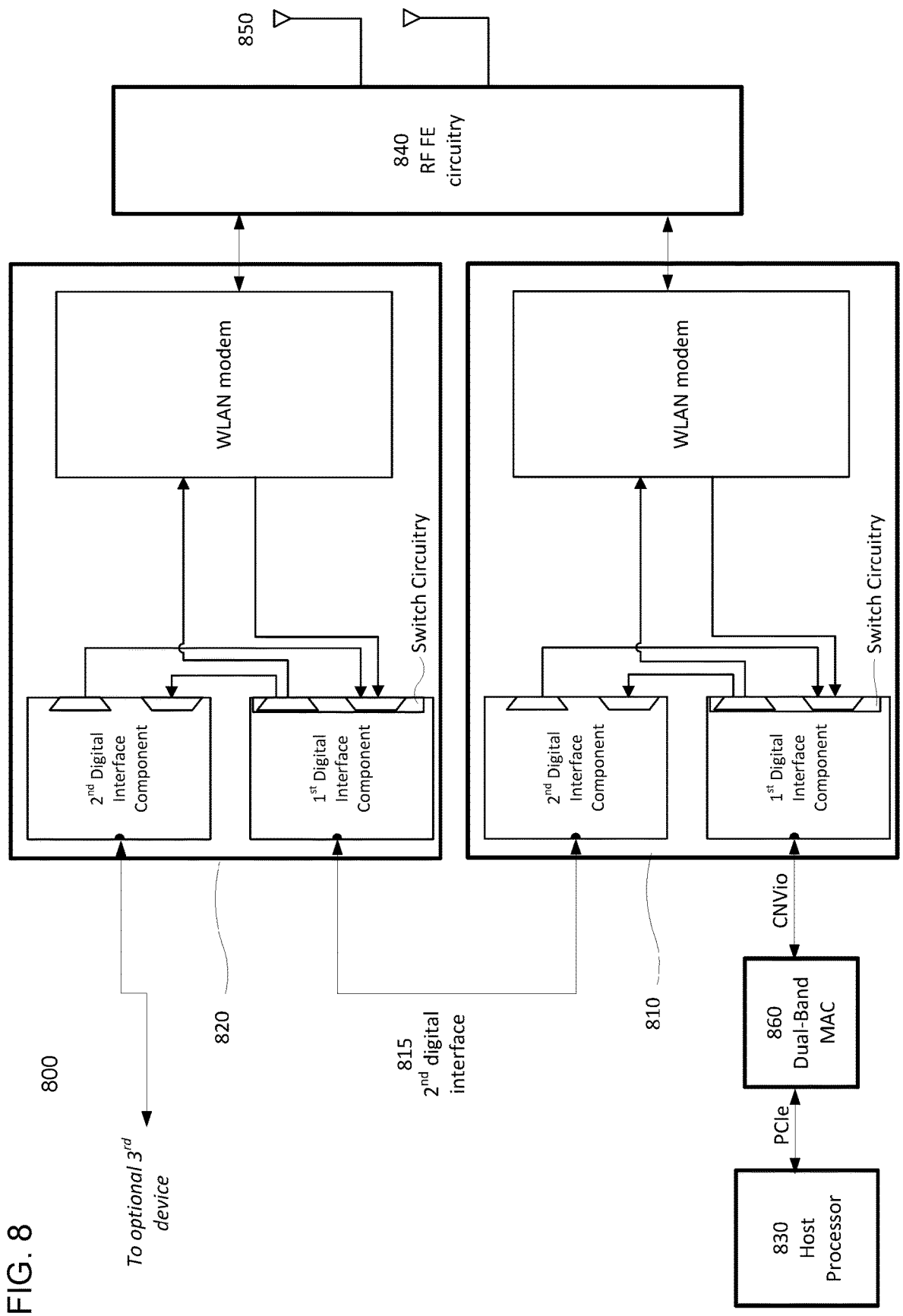
FIG. 8 exemplarily shows a third example of a dual-channel WLAN system according to some aspects.

In some aspects, the MAC layer processing may be performed external to the WLAN device 400/500, i.e., the WLAN modem 402/502 does not perform MAC layer processing. In some aspects, this may include the MAC layer processing being done at the host processor or, as shown in FIG. 8, at an intermediate Dual-Band MAC processor. In such an integrated case (i.e., MAC layer processing done external to the WLAN device and the remaining processing done by the WLAN modem), the interface between the first WLAN device and the external device may be configured to support MAC layer communications. In some aspects, the external device may be the SoC, in which case the interface between the first WLAN device and the SOC supports dual-channel MAC layer communications. In other words, the WLAN modem is configured to perform analog and RF processing, and the WLAN MAC processing may be performed by the host processor on the SoC. Accordingly, the interface between the host processor on the SoC and the first WLAN device is configured to communicate MAC layer communication and may be, for example, an Intel® CNVio interface. To support dual-channel in this type of architecture, the first and second digital interface components may be configured with the appropriate multiplexers/demultiplexers to support CNVi communications.

In other aspects (e.g., see, FIG. 8), an additional Dual-Band MAC layer processor may be arranged between the SoC and the first WLAN device so that a multifunction PCIe is not needed. The interface between the Dual-Band MAC layer processor and the host processor may be the PCIe interface and the interface between the Dual-Band MAC layer processor and the first WLAN device may be another interface to support MAC layer communications, e.g., an Intel® CNVio interface. In this aspect, the Dual-Band MAC controller and the first WLAN device may include the appropriate CNVio multiplexers and demultiplexers.

Figure 6:
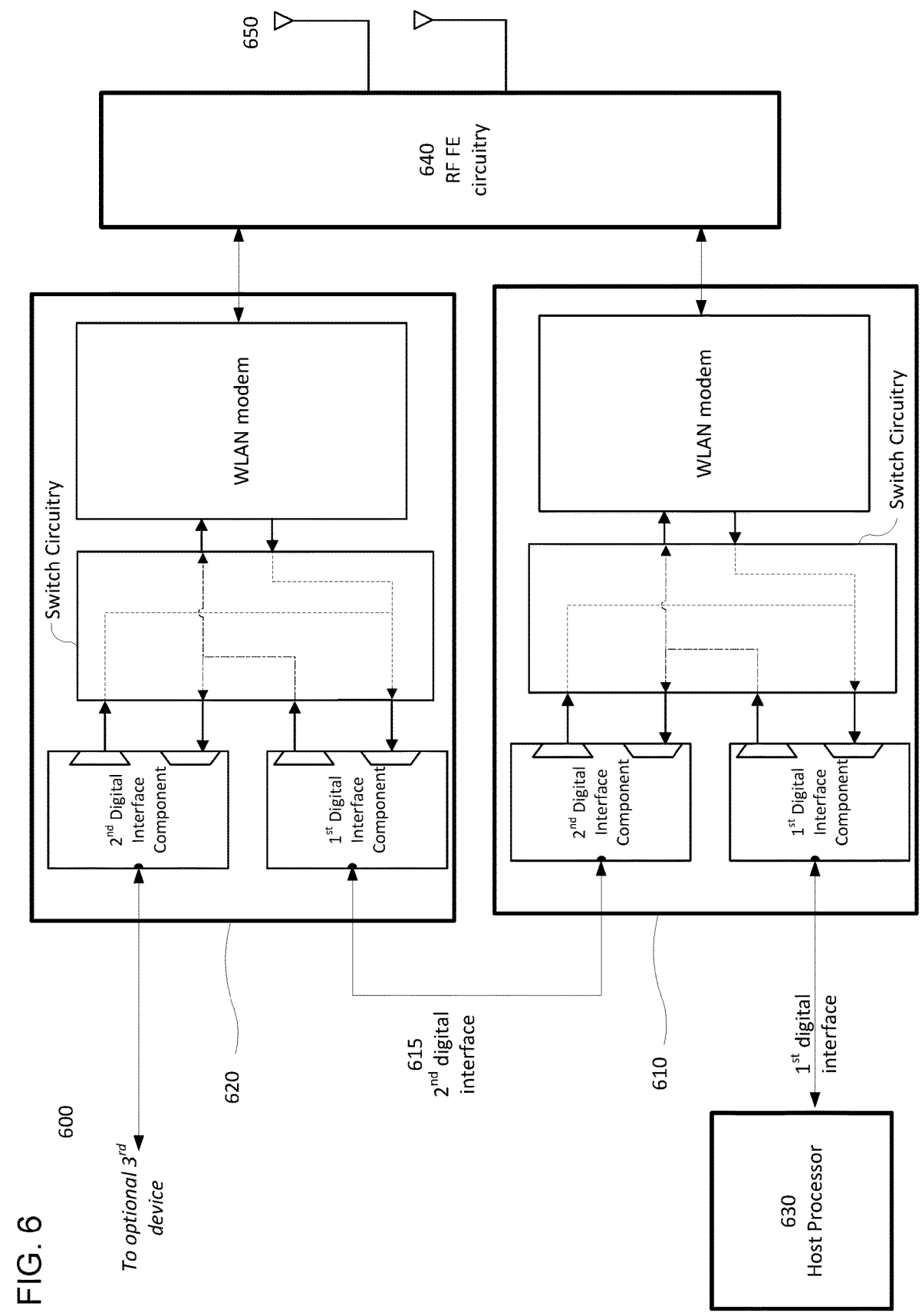
Figure 7:
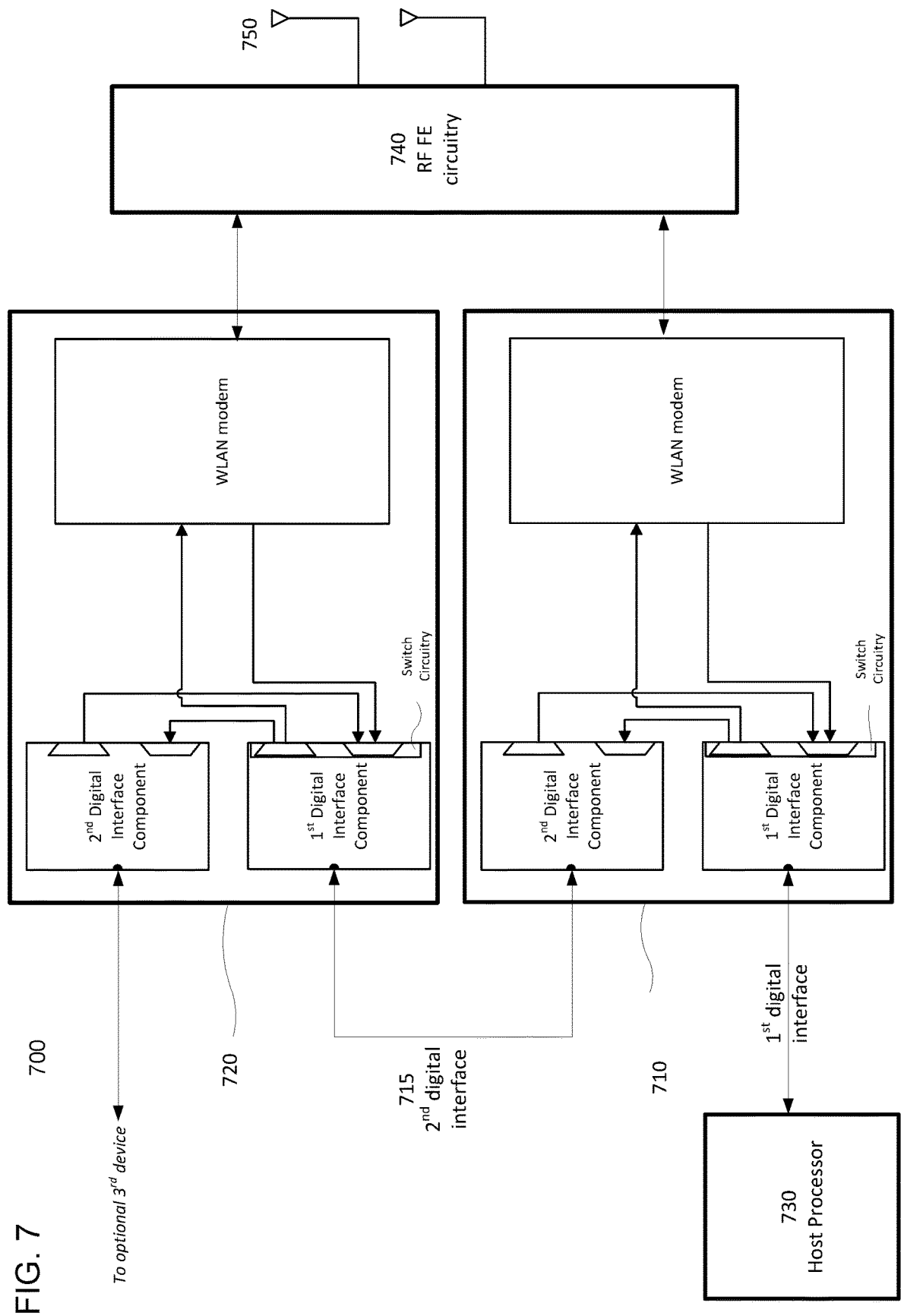
FIG. 7 exemplarily shows another example of a dual-channel WLAN system according to some aspects.

FIGS. 6-8 show examples of dual-band WLAN systems 600, 700, 800 according to some aspects. It is appreciated that dual-band WLAN systems 600, 700, 800 are exemplary in nature and may thus be simplified for purposes of this explanation. For example, there may be an I/O fabric (like I/O fabric 216 in FIG. 2) for purposes of switching messages to various other entities.

Each of dual-band systems 600, 700, 800 may include two of the single-channel WLAN devices described in FIGS. 4-5 that are cascaded together via a second digital interface connection 615, 715, 815 between the second digital interface component of the first WLAN device 610, 710, 810 and the first digital interface component of the second WLAN device 620, 720, 820. In this manner, dual-band WLAN systems 600, 700, 800 may support dual-band WLAN communications with a single interface with the host processor on the SoC.

Dual-band WLAN system 600 may include two WLAN devices 610, 620 corresponding to WLAN device 400 (switch circuitry not integrated into the first digital interface component). Dual-band WLAN system 700 may include two WLAN devices 710, 720 corresponding to WLAN device 500 (switch circuitry integrated into the first digital interface component). In each of dual-band WLAN systems 600, 700 the MAC processing may either be done in the WLAN modem or in the host processor and include the corresponding components discussed herein.

Dual-band WLAN system 800 may include two WLAN devices 810, 820 corresponding to either WLAN device 400 or 500 (only 500 is shown) and include an additional dual-band MAC layer processor 860 in between host processor 830 and first WLAN device 810 for performing MAC layer processing.

In each of dual-band WLAN systems 600, 700, 800, the host processor 630, 730, 830, respectively, may include hardware and/or software to perform the tasks described herein, e.g., host processor 212. In some aspects, as previously described in the integrated aspects, the host processors 630, 730, 830 may include components to perform MAC layer processing. In these aspects, the digital interface between the host processor 630, 730, 830 and the respective first WLAN device 610, 710, 810 may be configured to support MAC layer communications, e.g., Intel® CNVio, and include the appropriate multiplexers/demultiplexers at each side of the digital interface.

Each of RE FE circuitries 640, 740, 840 may include the components to perform the functions described with respect to RF FE 204 and each of antenna systems 650, 750, 850 may include antenna arrays with a plurality of antennas and correspond to antenna system 202. While only two antennas are shown in each of antenna system 650, 750, 850, it is appreciated that the antenna systems may be scalable to other amounts, e.g., four, eight, etc., antennas. The RE FE circuitries 640, 740, 840 may be configured to receive signals from the respective cascaded WLAN devices to perform WLAN communications in the dual-band context, i.e., perform concurrent/simultaneous WLAN communications on two bands. For example, this may include transmitting and/or receiving WLAN communications on any two of LB, HB, UHB, or WiGig via antenna system 650, 750, 850

In the dual-band configuration shown in WLAN systems 600, 700, 800, the purpose of the additional second digital interface component (e.g., 412 or 512) and the switch circuitry (e.g., 410 or 510) to the single-channel WLAN device is more readily appreciable. In some aspects, when a single-channel WLAN device such as 400 or 500 is cascaded with another single-channel WLAN device 400 or 500, the same type of single-channel WLAN device (e.g., 400 or 500) may serve to provide dual-band WLAN communications. In other words, a single type of WLAN device may be used for both single-band WLAN communications if used by itself (along with the host processor, RF FE, and antenna system) and for dual-band WLAN communications when cascaded with another WLAN device (along with the host processor, RF FE, and antenna system). Furthermore, in the dual-band setting, only a single interface between the host processor 630, 730, 830 is needed with the cascaded single-channel WLAN devices. A direct interface between the second WLAN device 620, 720, 820 and the host processor 630, 730, 830 is not required as the first WLAN device 630, 730, 830 serves to route the signals to the second WLAN device via the switch circuitry and the second digital interface component.

FIG. 9 shows a flowchart illustrating a method 900 for producing a single-channel WLAN device according to some aspects. It is appreciated that the method shown is exemplary in nature and may thus be simplified for purposes of this explanation.

Method 900 may include in addition to a first digital interface component for communicating with a first device external to the single-channel WLAN device, providing a second digital interface component configured to communicate with a second device external to the single-channel WLAN device 902 and providing a switch circuitry coupling the first digital interface component to the second digital interface component and to a WLAN modem of the WLAN device 904. Other steps in producing single-channel WLAN device may be included, such as those for producing conventional WLAN devices. The addition of the second digital interface component and the switch circuitry add on an extra silicon add-on not included in conventional single-channel WLAN devices. However, this extra silicon add-on allows for a single-channel WLAN device produced by method 900 to be cascaded with another single-channel WLAN device to enable dual-band WLAN communications.

FIG. 10 shows a flowchart illustrating a method 100 for producing a dual-channel WLAN device according to some aspects. It is appreciated that the method shown is exemplary in nature and may thus be simplified for purposes of this explanation.

Method 1000 may include in a first single-channel WLAN device, providing: a first digital interface component configured for communicating with a first device external to the first single-channel WLAN device, a second digital interface component configured for communicating with a second WLAN device, and a switch circuitry 1002; and providing a second digital interface between a second digital interface component of the first single-channel WLAN device and a first digital interface component of a second single-channel WLAN device 1004. In some aspects, method 1000 may further include that the second single-channel WLAN device does not have a direct WLAN communication data interface with the host processor and exclusively receives and transmits WLAN communication data with the host processor via the first WLAN device.

The following examples pertain to further aspects of this disclosure.

Example 1 is a wireless local area network (WLAN) device, including: a first digital interface component including a first digital interface terminal configured for communicating with a first device external to the WLAN device; a second digital interface component including a second digital interface terminal configured for communicating with a second device external to the WLAN device; and a switch circuitry coupling the first digital interface component to the second digital interface component and to a WLAN modem.

In Example 2, the subject matter of Example(s) 1 may include that the first digital interface component includes two first digital interface intra-device communication terminals, where a first of the two first digital interface intra-device communication terminals includes one or more output terminals coupled to the WLAN modem and to the second digital interface component via the switch circuitry, wherein the WLAN modem is configured to operate in one or more frequency bands and includes one or more terminals configured to be coupled with a radio frequency (RF) front end (FE) circuitry.

In Example 3, the subject matter of Example(s) 2 may include that a second of the two first digital interface intra-device communication terminals includes one or more input terminals coupled to the WLAN modem and to the second digital interface component via the switch circuitry.

In Example 4, the subject matter of Example(s) 1-3 may include that the second digital interface component includes two second digital interface intra-device communication terminals, where a first of the two second digital interface intra-device communication terminals includes one or more output terminals coupled to the first digital interface component via the switch circuitry.

In Example 5, the subject matter of Example(s) 4 may include that a second of the two second digital interface intra-device communication terminals includes an input terminal coupled to the first digital interface component via the switch circuitry.

In Example 6, the subject matter of Example(s) 1-5 may include that the switch circuitry is integrated into at least the first digital interface component.

In Example 7, the subject matter of Example(s) 1-6 may include that the first device is a system on Chip (SoC) including a host processor.

In Example 8, the subject matter of Example(s) 1-7 may include that the second device is a second WLAN device. This may include that include that the WLAN device does not have a direct WLAN communication data interface with the first device and exclusively receives and transmits WLAN communication data with the first device via the first WLAN device In Example 9, the subject matter of Example(s) 1-8 may include that the switch circuitry is configured to direct signals received from the second device via the second digital interface component to the first digital interface component via the switch circuitry, bypassing the WLAN modem of the WLAN device.

In Example 10, the subject matter of Example(s) 1-9 may include that the switch circuitry is configured to direct signals received from the first device intended for the WLAN device to the WLAN modem and direct signals intended for the second device to the second device via the second digital interface component.

In Example 11, the subject matter of Example(s) 1-10 may include that the WLAN modem includes medium access control (MAC) layer processing components.

In Example 12, the subject matter of Example(s) 11 may include that the first digital interface terminal and the second digital interface terminal are configured to support PCI Express (PCIe), and where a first digital interface between the first digital interface terminal and the first device is a PCIe interface.

In Example 13, the subject matter of Example(s) 1-10 may include that the WLAN device does not include medium access control (MAC) layer processing components, and where the MAC layer processing components are external to the WLAN device.

In Example 14, the subject matter of Example(s) 13 may include that the first digital interface terminal is configured to support MAC layer communications with the first device.

In Example 15, the subject matter of Example(s) 14 may include that the first digital interface terminal is configured to support MAC layer communications for two or more frequency bands.

Example 16 is a wireless local area network (WLAN) system including: a first WLAN device including: a first digital interface component including a first digital interface terminal configured for communicating with a System on Chip (SoC) external to the first WLAN device via a first digital interface, a second digital interface component including a second digital interface terminal configured for communicating with a second device external to the first WLAN device, a switch circuitry coupling the first digital interface component to the second digital interface component and to a WLAN modem, and the WLAN modem configured to operate in one or more frequency bands and coupled with a radio frequency (RF) front end (FE) circuitry; the SoC including a host processor and coupled to the first digital interface terminal via a first digital interface; and the RF FE circuitry coupled to the WLAN modem of the first WLAN device.

In Example 17, the subject matter of Example(s) 16 may include an antenna array coupled the RF FE circuitry.

In Example 18, the subject matter of Example(s) 17 may include that the antenna array includes a plurality of antennas for conducting Multiple Input, Multiple Output (MIMO) communications.

In Example 19, the subject matter of Example(s) 18 may include that the antenna array includes 2 or 4 antennas.

In Example 20, the subject matter of Example(s) 16-19 may include a separate medium access control (MAC) layer controller including MAC layer processing components arranged between the WLAN device and the SoC.

In Example 21, the subject matter of Example(s) 20 may include that the separate MAC layer controller includes: a first terminal coupled to the first digital interface terminal for communicating via a first digital interface standard; and a second terminal coupled to the SoC for communicating via a second digital interface standard.

In Example 22, the subject matter of Example(s) 21 may include that the first digital interface standard is different from the second digital interface standard.

In Example 23, the subject matter of Example(s) 16-22 may include that the second device is a second WLAN device, the second WLAN device including a first digital interface component including a first digital interface terminal coupled to the second digital interface terminal of the first WLAN device via a second digital interface; a second digital interface component including a second digital interface terminal configured to communicate with a third device external to the second WLAN device; a switch circuitry coupling the first digital interface component of the second WLAN device to the second digital interface component of the second WLAN device and to a WLAN modem of the second WLAN device; and the WLAN modem of the second WLAN device configured to operate in one or more frequency bands, where the WLAN modem of the second WLAN device is coupled to the RF FE circuitry.

In Example 24, the subject matter of Example(s) 23 may include that the second WLAN device does not include a direct interface with the SoC and communicates with the SoC via the first WLAN device.

In Example 25, the subject matter of Example(s) 23-24 may include that the first WLAN device is configured to conduct wireless communications in a first frequency band via the RF FE circuitry, and the second WLAN device is configured to concurrently conduct wireless communications in a second frequency band via the RF FE circuitry.

In Example 26, the subject matter of Example(s) 25 may include that the first frequency band and the second frequency band are different.

In Example 27, the subject matter of Example(s) 25-26 may include that the first frequency band and the second frequency band are selected from: a frequency band centered around 2.4 GHz, a frequency band between 5-6 GHz, a frequency band between 6-7 GHz, or a frequency band in a 60 GHZ range.

In Example 28, the subject matter of Example(s) 25-27 may include that the switch circuitry of the first WLAN device is configured to direct signals received from the second WLAN device via the second digital interface component of the first WLAN device to the SoC via the first digital interface component and the switch circuitry of the first WLAN device, bypassing the WLAN modem of the first WLAN device.

In Example 29, the subject matter of Example(s) 25-28 may include that the switch circuitry of the first WLAN device is configured to direct signals received from the SoC for communicating on the first frequency band to the WLAN modem of the first WLAN device and direct signals received from the SoC for communicating on the second frequency band to the second WLAN device via the second digital interface component of the first WLAN device.

In Example 30, the subject matter of Example(s) 23-29 may include that the switch circuitry of each of the respective first WLAN device and second WLAN device is integrated into at least the first digital interface component of the respective first WLAN device or second WLAN device.

In Example 31, the subject matter of Example(s) 16-30 may include that the SoC includes medium access control (MAC) layer processing components, and the first digital interface is configured to support MAC layer communications between the first WLAN device and the SoC via the first digital interface, and the second digital interface is configured to support MAC layer communications between the first WLAN device and the second WLAN device.

Example 32 is a method for producing a single-channel WLAN device, the method including: in addition to a first digital interface component configured for communicating with a first device external to the WLAN device, providing a second digital interface component configured for communicating with a second device external to the WLAN device; and providing a switch circuitry coupling the first digital interface component to the second digital interface component and to a WLAN modem of the WLAN device.

Example 33 is a method for producing a dual-channel WLAN device, the method including: in a first single-channel WLAN device, providing a first digital interface component configured for communicating with a first device external to the first single-channel WLAN device, a second digital interface component configured for communicating with a second WLAN device, and a switch circuitry; and providing a second digital interface between a second digital interface component of the first single-channel WLAN device and a first digital interface component of the second single-channel WLAN device.

In Example 34, the subject matter of Example(s) 33 may include wherein the second single-channel WLAN device transmits and receives data for WLAN communications with the first device exclusively through the first single-channel WLAN device.

In Example 35, the subject matter of Example(s) 33-34 may include wherein the first single-channel WLAN device and the second single-channel WLAN device are configured to concurrently perform WLAN communications on two distinct frequency bands.

In Example 36, the subject matter of Example(s) 35 may include wherein the two distinct frequency bands are selected from the group consisting of a low-band (LB) at 2.4 GHz, a high-band (HB) in the range of 5-6 GHz, an ultra-high-band (UHB) in the range of 6-7 GHZ, or WiGig in the 60 GHZ frequency band.

In Example 37, the subject matter of Example(s) 33-36 may include wherein each of the first single-channel WLAN device and the second single-channel WLAN device include a WLAN modem.

Example 38 is a wireless local area network (WLAN) device, including: means to communicate with a first device external to the WLAN device; means to communicate with a second device external to the WLAN device; means to couple the first digital interface component to the second digital interface component and to a WLAN modem; means to operate in one or more frequency bands and means to couple with a radio frequency (RF) front end (FE) circuitry.

Example 39 is a wireless local area network (WLAN) system including: a first WLAN device including: means to communicate with a System on Chip (SoC) external to the first WLAN device via a first digital interface, means to communicate with a second device external to the first WLAN device, means to couple the first digital interface component to the second digital interface component and to a WLAN modem, and means to operate in one or more frequency bands and coupled with a radio frequency (RF) front end (FE) circuitry; the SoC including a host processor and coupled to the first digital interface terminal via a first digital interface; and the RF FE circuitry coupled to the WLAN modem of the first WLAN device.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A wireless local area network (WLAN) device, comprising:
   a first digital interface component comprising a first digital interface terminal configured for communicating with a first device external to the WLAN device;
   a second digital interface component comprising a second digital interface terminal configured for communicating with a second device external to the WLAN device; and
   a switch circuitry coupling the first digital interface component to the second digital interface component and to a WLAN modem, wherein the switch circuitry is configured to direct signals received from the second device via the second digital interface component to the first digital interface component via the switch circuitry, bypassing the WLAN modem of the WLAN device.

2. The WLAN device of claim 1, wherein the first digital interface component comprises two first digital interface intra-device communication terminals, wherein a first of the two first digital interface intra-device communication terminals comprises one or more output terminals coupled to the WLAN modem and to the second digital interface component via the switch circuitry, wherein the WLAN modem is configured to operate in one or more frequency bands and comprises one or more terminals configured to be coupled with a radio frequency (RF) front end (FE) circuitry.

3. The WLAN device of claim 2, wherein a second of the two first digital interface intra-device communication terminals comprises one or more input terminals coupled to the WLAN modem and to the second digital interface component via the switch circuitry.

4. The WLAN device of claim 1, wherein the second digital interface component comprises two second digital interface intra-device communication terminals, wherein a first of the two second digital interface intra-device communication terminals comprises one or more output terminals coupled to the first digital interface component via the switch circuitry.

5. The WLAN device of claim 4, wherein a second of the two second digital interface intra-device communication terminals comprises an input terminal coupled to the first digital interface component via the switch circuitry.

6. The WLAN device of claim 1, wherein the switch circuitry is configured to direct signals received from the first device intended for the WLAN device to the WLAN modem and direct signals intended for the second device to the second device via the second digital interface component.

7. The WLAN device of claim 1, wherein the first device is a system on Chip (SoC) comprising a host processor.

8. The WLAN device of claim 1, wherein the second device is a second WLAN device.

9. The WLAN device of claim 8, wherein the WLAN device is configured, via the second digital interface component, the switch circuitry, and the first digital interface component, to allow the second WLAN device to communicate WLAN data with the first device without a direct interface between the second WLAN device and the first device.

10. A wireless local area network (WLAN) system comprising:
   a first WLAN device comprising:
      a first digital interface component comprising a first digital interface terminal configured for communicating with a System on Chip (SoC) external to the first WLAN device via a first digital interface,
      a second digital interface component comprising a second digital interface terminal configured for communicating with a second device external to the first WLAN device,
      a switch circuitry coupling the first digital interface component to the second digital interface component and to a WLAN modem, wherein the switch circuitry is configured to direct signals received from the second device via the second digital interface component to the first digital interface component via the switch circuitry, bypassing the WLAN modem of the first WLAN device, and
      the WLAN modem configured to operate in one or more frequency bands and coupled with a radio frequency (RF) front end (FE) circuitry;
   the SoC comprising a host processor and coupled to the first digital interface terminal via a first digital interface; and
   the RF FE circuitry coupled to the WLAN modem of the first WLAN device.

11. The WLAN system of claim 10, wherein the second device is a second WLAN device, the second WLAN device comprising:
   a first digital interface component comprising a first digital interface terminal coupled to the second digital interface terminal of the first WLAN device via a second digital interface;
   a second digital interface component comprising a second digital interface terminal configured to communicate with a third device external to the second WLAN device;
   a switch circuitry coupling the first digital interface component of the second WLAN device to the second digital interface component of the second WLAN device and to a WLAN modem of the second WLAN device; and
   the WLAN modem of the second WLAN device configured to operate in one or more frequency bands, wherein the WLAN modem of the second WLAN device is coupled to the RF FE circuitry.

12. The WLAN system of claim 11, wherein the second WLAN device does not comprise a direct interface with the SoC and communicates with the SoC via the first WLAN device.

13. The WLAN system of claim 11, wherein the first WLAN device is configured to conduct wireless communications in a first frequency band via the RF FE circuitry, and the second WLAN device is configured to concurrently conduct wireless communications in a second frequency band via the RF FE circuitry.

14. The WLAN system of claim 13, wherein the first frequency band and the second frequency band are different.

15. The WLAN system of claim 13, wherein the first frequency band and the second frequency band are selected from: a frequency band centered around 2.4 GHz, a frequency band between 5-6 GHZ, a frequency band between 6-7 GHz, or a frequency band in a 60 GHZ range.

16. The WLAN system of claim 13, wherein the switch circuitry of the first WLAN device is configured to direct signals received from the second WLAN device via the second digital interface component of the first WLAN device to the SoC via the first digital interface component and the switch circuitry of the first WLAN device, bypassing the WLAN modem of the first WLAN device.

17. The WLAN system of claim 13, wherein the switch circuitry of the first WLAN device is configured to direct signals received from the SoC for communicating on the first frequency band to the WLAN modem of the first WLAN device and direct signals received from the SoC for communicating on the second frequency band to the second WLAN device via the second digital interface component of the first WLAN device.

18. The WLAN system of claim 13, wherein the switch circuitry of each of the respective first WLAN device and second WLAN device is integrated into at least the first digital interface component of the respective first WLAN device or second WLAN device.

19. The WLAN system of claim 10, further comprising an antenna array coupled the RF FE circuitry, wherein the antenna array comprises a plurality of antennas for conducting Multiple Input, Multiple Output (MIMO) communications.

* * * * *